United States Patent [19]

Robbins

[11] 3,727,623
[45] Apr. 17, 1973

[54] DIAPHRAGM VALVE
[75] Inventor: James F. Robbins, Westford, Mass.
[73] Assignee: Sybron Corporation, Rochester, N.Y.
[22] Filed: Nov. 27, 1970
[21] Appl. No.: 93,137

[52] U.S. Cl. ............... 137/1, 137/599, 137/625.3, 137/625.33, 251/14, 251/61.1, 251/331
[51] Int. Cl. ............................................ F16k 31/145
[58] Field of Search ................ 137/512.15, 516.11, 137/525, 599, 601, 625.3, 625.33, 1; 251/5, 14, 60, 61.1, 331

[56] References Cited

UNITED STATES PATENTS

| R19,151 | 5/1934 | Saunders | 251/331 |
|---|---|---|---|
| 3,426,999 | 2/1969 | Toinet | 251/331 |
| 3,511,472 | 5/1970 | Zimmerman | 251/331 X |
| 2,677,390 | 5/1954 | Davis et al. | 251/331 X |
| 3,415,275 | 12/1968 | Berggren | 251/61.1 X |
| 2,572,175 | 10/1951 | McPherson | 251/61.1 X |
| 2,907,346 | 10/1959 | Fortune | 137/599 X |
| 2,931,386 | 4/1960 | Boehler | 137/599 |
| 3,092,144 | 6/1963 | Green | 137/625.3 |

FOREIGN PATENTS OR APPLICATIONS

| 614,351 | 6/1935 | Germany | 251/331 |
|---|---|---|---|
| 132,806 | 10/1946 | Australia | 251/5 |

Primary Examiner—Robert G. Nilson
Attorney—Theodore B. Roessel

[57] ABSTRACT

A diaphragm valve is provided with an improved sealing surface and a mechanical flow regulator for precise flow control. The valve has a body with an inlet chamber and an outlet chamber. Passages extend from both chambers to at least one side of the body. The passages are covered by a diaphragm which in turn is covered by a cap. The cap and diaphragm define a control cavity which may be pressurized to force the diaphragm against the side of the body, thereby closing the valve. The openings from the passages are surrounded with ridges, which reduce the effective sealing area against which the diaphragm presses. The cap also supports a mechanical flow regulator which presses the diaphragm towards the body of the valve between the passages from the inlet chamber and the passages to the outlet chamber.

14 Claims, 7 Drawing Figures

PATENTED APR 17 1973 3,727,623

INVENTOR.
JAMES F. ROBBINS
BY Theodore B Roessel
ATTORNEY

INVENTOR.
JAMES F. ROBBINS
BY Theodore B Roessel
ATTORNEY

DIAPHRAGM VALVE

BACKGROUND OF THE INVENTION

This invention relates to a diaphragm valve and more particularly to a diaphragm valve with an improved sealing surface and a flow regulator for metering the flow through the valve.

Diaphragm valves are used in a variety of fluid flow systems because they can be made to withstand corrosive conditions and because they can handle abrasive fluids. One common type utilizes a body with an inlet port or chamber, an outlet port or chamber and a number of small passageways from both ports to at least one side of the body. A diaphragm is pressed by fluid pressure behind the diaphragm against the side of the body to close the valve, and permitted to flex away from the side of the body to permit fluid to flow from the inlet port through the small passageways to the outlet port. Valves of this type are shown in U.S. Pat. Nos. 2,786,642; 2,818,880 and 3,092,144.

Since the diaphragms in valves of this type only have to bridge small openings, the need for rigidity and strength in the diaphragms is reduced. As a result, these valves offer better seals and less likelihood of diaphragm rupture. However, in this type of valve, the sealing surface, i.e., the area against which the diaphragm is pressed, is relatively large. As a result, the pressure needed to seal the valve is higher than it would be if the effective sealing area were smaller. It is an object of this invention to provide a valve with a smaller effective sealing area.

Another drawback of conventional diaphragm valves of this type is the fact that they are basically on-off devices. It is true that a certain amount of control can be achieved by varying the pressure behind the diaphragm, but the degree of control afforded in this manner is not sufficient to make the valves suitable for close flow control. Another object of this invention is to provide a diaphragm valve that does provide accurate flow control.

SUMMARY OF THE INVENTION

This invention provides a valve having a body with an inlet port or chamber and an outlet port or chamber. A flexible member overlies at least part of an exterior surface of the body. There is at least one opening in this surface that communicates with the inlet chamber and with the flexible member, and at least one opening in the surface that communicates with the outlet chamber and with the flexible member. Preferably, there are a plurality of small openings that communicate with each chamber. A cap overlies the flexible member, and the flexible member and the cap define a control cavity which overlies the openings. Means are provided for pressurizing the control cavity, thereby forcing the flexible member against the openings and closing the valve.

At least some of the openings are surrounded by small ridges. These ridges reduce the effective sealing area against which the flexible member is forced by the pressure in the control cavity. As a result, effective seals can be achieved with lower pressures in the cavity.

The control cavity also contains a mechanical flow regulator which presses the flexible member towards the surface of the body between the openings that communicate with the inlet chamber and the openings that communicate with the outlet chamber. The flow regulator may be used to control precisely the distance between the flexible member and the surface of the body between the two sets of openings. Thus, accurate control of the rate of fluid flow through the valve can be achieved.

DETAILED DESCRIPTION OF THE INVENTION

Figure 1:
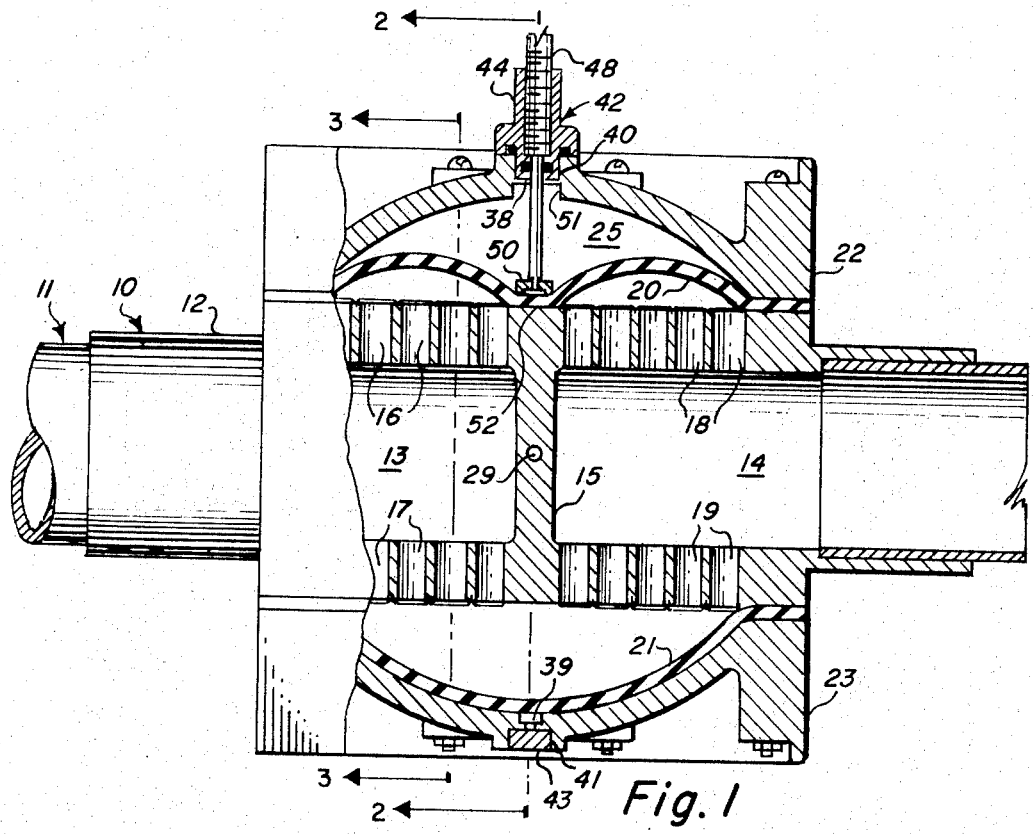
FIG. 1 is a partially sectioned side elevation view of one embodiment of this invention.

FIG. 1 shows a valve 10 embodying this invention installed in a pipeline 11 in which fluid is flowing from left to right. The valve has a body 12 containing an inlet port or chamber 13 and an outlet port or chamber 14. The two chambers 13 and 14 are separated by a central divider 15.

Figure 3:
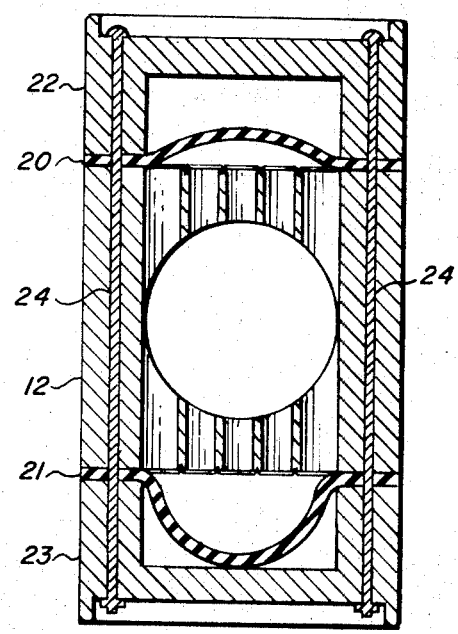

Flow passages 16 extend from inlet chamber 13 to the upper side of body 12. Another set of flow passages 17 extend from inlet chamber 13 to the bottom side of body 12. Similarly, two sets of flow passages 18 and 19 extend from the upper and lower sides of body 11 to outlet chamber 14. The openings from passages 16 and 18 on the upper side of body 12 are covered by a flexible member or diaphragm 20 which is preferably made of an elastomeric material such as urethane rubber, silicone rubber, neoprene or buna-N. The best material for any particular application will depend upon operating conditions such as the fluid being handled, the pressure and the frequency of cycling. The openings from passages 17 and 19 on the bottom side of body 12 are covered by a similar diaphragm 21. Diaphragms 20 and 21 are held in place by an upper cap 22 and a lower cap 23. As shown in FIG. 3, the caps 22 and 23 and diaphragms 20 and 21 are secured to the body by bolts 24 that extend through the valve from top to bottom.

Figure 2:
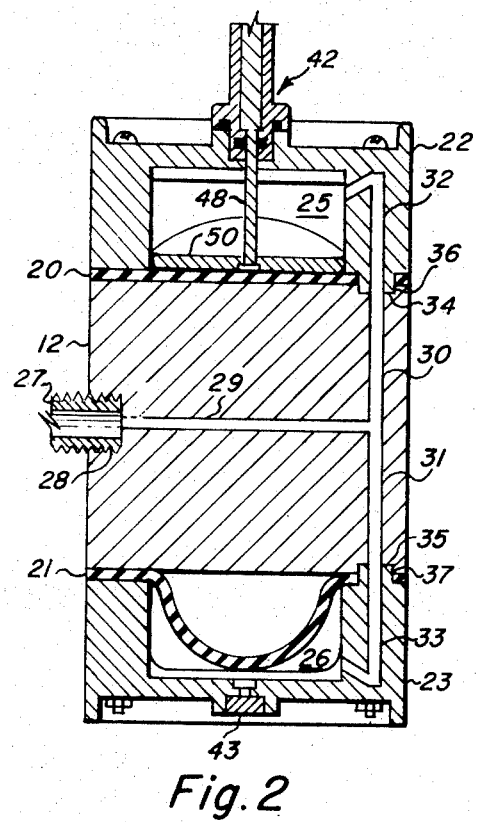
FIGS. 2 and 3 are cross-sectional views of the valve shown in FIG. 1.

The upper and lower caps 22 and 23 and diaphragms 20 and 21 define control cavities 25 and 26 respectively. The cavities may be pressurized with a control fluid to close the valve. Referring to FIG. 2, the control fluid is supplied through a line 27 inserted in a threaded port 28 in valve body 12. From port 28, the control fluid passes through a passage 29 that extends through the central divider 15 of body 12 to two branch passages 30 and 31 that lead to the top and bottom of the valve body 12. These branch passages 30 and 31 connect with passages 32 and 33 through the upper and lower caps 22 and 23 that carry the control fluid to cavities 25 and 26.

Branch passages 30 and 31 open into recesses 34 and 35 in the top and bottom of the valve body. The caps 22 and 23 have bosses 36 and 37 that extend through holes in the diaphragms 20 and 21 into these recesses. The bosses ensure that the diaphragms do not block the control fluid passages and also serve to help align the diaphragms during assembly of the valve.

The drawings depict the valve as it would be with fluid flowing in the pipeline and with no pressure in the control cavities. Thus, the lower diaphragm 21 is free to flex into cavity 26, thereby permitting the fluid in pipeline 11 to flow from the inlet chamber 13 through passages 17 and then back through passages 19 to the outlet chamber 14.

Figure 6:
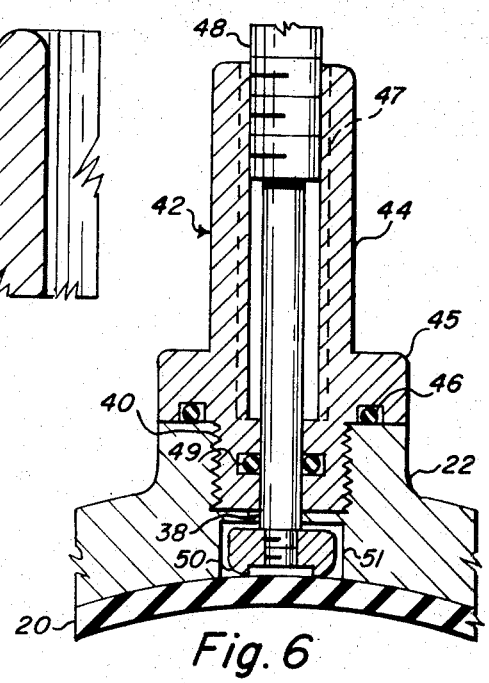
FIG. 6 is an enlarged sectional view of the top cap and flow regulator of the valve shown in FIG. 1, from the same viewing point as in FIG. 1.
Figure 7:
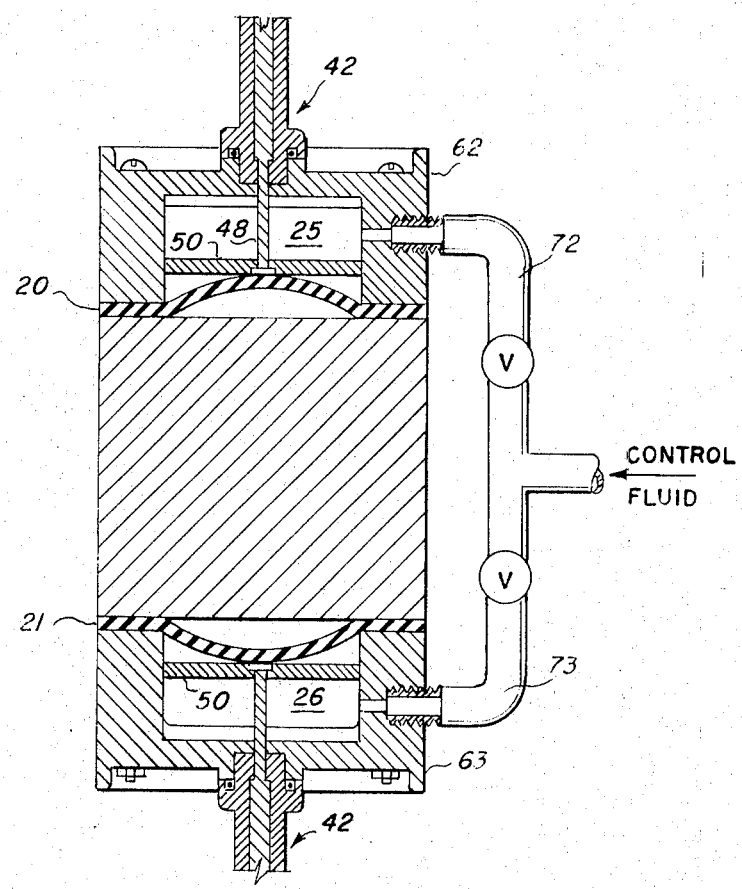
FIG. 7 is a cross-sectional view of another embodiment of this invention.

In the valve shown in FIGS. 1 – 3, a mechanical flow regulator 42 is mounted in the top cap 22. With the regulator in the position shown in FIGS. 1 and 2, no fluid flows through the upper passages 16 and 18. However, if neither cap contained a regulator, or if the regulator was fully retracted, as shown in FIG. 6, the upper and lower diaphragms 20 and 21 would work in unison. Of course, in the event that it is desirable to selectively use pressurizing control fluid to shut off flow through either the upper or lower flow passages separately, individual control fluid lines to the respective control cavities may be provided, as shown in FIG. 7.

In the valve shown in the drawings, when the control cavities are pressurized the diaphragms 20 and 21 are pressed against the sides of the valve body 12, thereby closing the valve. The sides of the valve are provided with an improved sealing surface, which is shown in greater detail in FIGS. 4 and 5. As a result, effective seals can be achieved with lower pressures in the control cavities.

Figure 4:
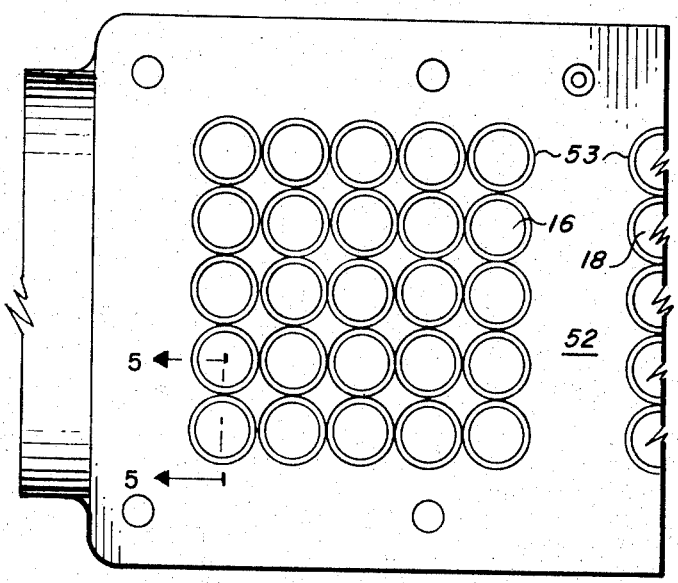
FIG. 4 is a plan view of the body of the valve shown in FIG. 1.
Figure 5:
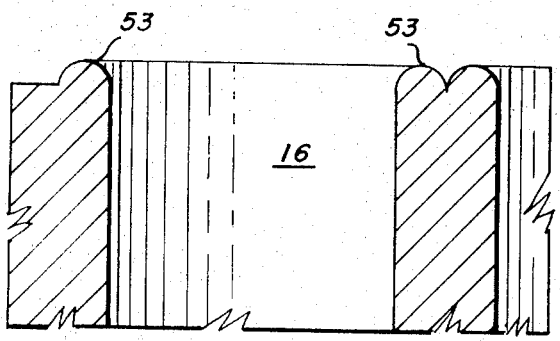
FIG. 5 is an enlarged sectional view of the body shown in FIG. 4.

Referring to FIGS. 4 and 5, the openings on the sides of the valve from at least some of the flow passages are surrounded by individual ridges 53. In the valve shown, there are ridges around the openings from all of the flow passages. However, in some cases it may be desirable to supply ridges around some, but not all, of the openings. For example, in some cases a satisfactory seal is achieved if ridges are provided only around the openings from the passages from the inlet chamber.

The ridges reduce the effective sealing area between the diaphragm and the surface of the valve body. Thus, fluid tight seals may be achieved with lower control cavity pressures. The ridges shown in the drawings have a semicircular cross-section; however, ridges with various other cross-sections, such as square, triangular or the like, may be used. The effective sealing area will depend upon the properties of the diaphragm and the type of ridge used. If ridges with a narrow triangular cross-section are used in connection with a stiff diaphragm that does not tend to wrap around the ridges, the effective sealing area may be reduced to the point where line contact seals are achieved.

The control fluid provides a means for opening and closing the valve rapidly and positively. However, this mechanism is not suitable for accurate control of the rate of flow through the valve. Therefore, the action of the control fluid is supplemented by one or more mechanical flow regulators 42 which can be used for precise flow control.

Referring to FIGS. 1, 2 and 6, stepped bores 38 and 39 extend through the upper and lower caps 22 and 23. The largest portion 40 and 41 of each bore 38 and 39 is threaded so that either a flow regulator 42 or a plug 43 may be mounted in either cap. In the valve shown in FIGS. 1 and 2, a flow regulator 42 is mounted in the upper cap 22 and a plug 43 is used to close off the bore 39 in lower cap 23. Of course, if a greater flexibility of flow control is desired, flow regulators may be mounted in both caps.

Flow regulator 42 has a body 44, the lower portion of which is threaded to engage the threaded portion 40 of bore 38. As best seen in FIG. 6, the body 44 has a flange 45 that is grooved to accept an O-ring 46 which provides a fluid tight seal between the cap 22 and the regulator body 44.

A bore 47 extends through the regulator body 44. The upper portion of bore 47 is threaded and a shaft 48, having at least one threaded end, is mounted in bore 47 and extends through the bore 38 in the cap into the control cavity 25. As shown in FIG. 6, there is a groove in the lower part of bore 47 and an O-ring 49 in the groove which provides a fluid tight seal between shaft 48 and the regulator body 44.

A bar 50 is attached to the end of shaft 48 that extends into control cavity 25. The bar 50 is attached so that the shaft 48 may rotate without turning the bar. As shown in FIG. 2, the length of bar 50 is slightly less than the width of control cavity 25. The width of the bar is sufficient to keep the bar from turning in the control cavity when the shaft is rotated. As is best shown in FIGS. 1 and 6, the cap 22 defines a channel 51 that extends across the control cavity 25. Bore 38 opens into this channel. The bar 50 may be retracted into channel 51, which gets it completely out of the way of diaphragm 20.

The axis of bore 38 in cap 22 and bore 47 in regulator body 44 intersects the side of valve body 12 in an area 52 between the passages from the inlet chamber and the passages to the outlet chamber. In the valve shown, the area 52 is a planar surface free of openings, however, any desired surface may be used as long as bar 50 is adapted to conform to the surface in this area so that the bar can press the diaphragm against the body across the width of the control cavity. In some cases it may be desirable to utilize ridges or the like across the side of the valve body in the area under the bar in order to provide a more positive seal.

By screwing shaft 48 into or out of bore 47, thereby reciprocating the shaft in bore 38, the distance between diaphragm 20 and the side of valve body 12 in the area between the passages may be changed. In this manner, the fluid flow rate through the valve may be controlled precisely.

Other types of flow regulators may be used in this valve. For example, a regulator body with a smooth bore and a smooth shaft may be used in connection with an automatic valve positioner. This type of regulator is particularly suited for use in automated systems.

FIG. 7 illustrates a valve in which mechanical flow regulators 42 are mounted in both the top cap 62 and the bottom cap 63. In addition, an individual control fluid line 72, 73 is provided for each cap. Thus, the valve can be switched back and forth between pre-set flow rates by adjusting one or both regulators and then supplying control fluid to the top control cavity 25, to the bottom control cavity 26, or to both cavities.

If a valve that can be switched back and forth rapidly to provide fluid at a wider variety of pre-set flow rates is desired, the control passages in the body may be omitted or relocated and the two remaining sides of the body may be provided with flow passages and with caps, diaphragms, control fluid supply lines, and flow regulators to control flow through them. In this manner, four individually controlled flow paths may be provided. The valve may be used to supply fluid at a variety of pre-set flow rates by adjusting the flow regulators and then supplying control fluid to various combinations of the individual caps.

If greater flexibility is required, valve bodies with six, eight or more sides can be used. Alternatively, a round body could be surrounded with a number of caps, each with its own regulator and control fluid supply line. These and many other modifications may be made within the scope of this invention, which is defined by the appended claims.

I claim:

1. A diaphragm valve comprising:
    a. a body having an inlet chamber and an outlet chamber;
    b. first and second flexible members overlying separate parts of the exterior of the body;
    c. at least one opening in the body that communicates with the inlet chamber and with the first flexible member, and at least one opening in the body that communicates with the inlet chamber and with the second flexible member;
    d. at least one opening in the body that communicates with the outlet chamber and with the first flexible member, and at least one opening in the body that communicates with the outlet chamber and with the second flexible member;
    e. a first cap overlying said first flexible member and a second cap overlying said second flexible member, said caps and said flexible members defining control cavities that overly said openings;
    f. a mechanical flow regulator within at least one of the cavities for pressing the flexible member toward the body; and
    g. means for individually supplying control fluid to each control cavity, whereby the valve may be switched between a number of pre-set flow rates by selectively supplying control fluid to the individual control cavities.

2. A diaphragm valve according to claim 1 wherein there is a bore through the top of the cap that defines the control cavity containing the mechanical flow regulator and the flow regulator comprises:
    a. a shaft extending through the bore in the cap;
    b. a bar within the control cavity, said bar being attached to the shaft and adapted to conform to said body between the opening that communicates with the inlet chamber and the opening that communicates with the outlet chamber; and
    c. means for reciprocating the shaft within the bore.

3. A diaphragm valve according to claim 2 wherein the shaft is threaded at one end and the bar is attached at the other end of the shaft so that the shaft can rotate relative to the bar, and the means for reciprocating the shaft comprises a regulator body mounted in the bore in the cap, said regulator body having a threaded bore through which the threaded end of the shaft extends.

4. A diaphragm valve according to claim 3 wherein the length of the bar is slightly less than the width of the control cavity and the width of the bar is sufficient to keep the bar from turning when the shaft is rotated.

5. A diaphragm valve according to claim 2 wherein the cap defines a transverse channel extending across the top of the cavity into which the bar can be retracted.

6. A diaphragm valve according to claim 1 wherein there are:
    a. a plurality of small openings that communicate with the inlet chamber and with the flexible member, and
    b. a plurality of small openings that communicate with the outlet chamber and with the flexible member.

7. A diaphragm valve comprising:
    a. a body having an inlet port and an outlet port;
    b. a flexible member overlying at least part of an exterior surface of the body;
    c. a plurality of small openings in said surface that communicate with the flexible member and with the inlet chamber;
    d. a plurality of small openings in said surface that communicate with the outlet chamber and with the flexible member;
    e. a cap overlying the flexible member, said cap and said flexible member defining a control cavity that overlies all of said openings;
    f. means for adding control fluid to the cavity to press the flexible member against the openings; and
    g. individual ridges around at least some of said small openings, whereby the control fluid pressure needed to seal the openings is reduced.

8. A diaphragm valve according to claim 7 wherein the flexible member is an elastomeric diaphragm.

9. A diaphragm valve according to claim 7 wherein the ridges have a semicircular cross-section.

10. A diaphragm valve according to claim 7 wherein all of said small openings are surrounded by individual ridges.

11. A diaphragm valve comprising:
    a. a body having an inlet chamber and an outlet chamber;
    b. first and second flexible members overlying separate parts of the exterior of the body;
    c. a plurality of small openings in the body that communicate with the inlet chamber and with the first flexible member, and a plurality of small openings in the body that communicate with the inlet chamber and with the second flexible member;
    d. a plurality of small openings in the body that communicate with the outlet chamber and with the first flexible member, and a plurality of small openings in the body that communicate with the outlet chamber and with the second flexible member;
    e. individual ridges around at least some of said small openings;
    f. a first cap overlying said first flexible member and a second cap overlying said second flexible member, said caps and said flexible members defining control cavities that overly said openings;
    g. means for adding control fluid to the cavities to press the flexible members against the openings; and
    h. a mechanical flow regulator within at least one of the cavities for pressing the flexible member toward the body.

12. A valve according to claim 11 wherein the ridges have a semicircular cross-section.

13. A valve according to claim 11 wherein the flexible member is an elastomeric diaphragm.

14. A method of controlling a diaphragm valve having:
   a. a body having an inlet chamber and an outlet chamber;
   b. first and second flexible members overlying separate parts of the exterior of the body;
   c. at least one opening in the body that communicates with the inlet chamber and with the first flexible member, and at least one opening in the body that communicates with the outlet chamber and with the second flexible member;
   d. at least one opening in the body that communicates with the outlet chamber and with the first flexible member, and at least one opening in the body that communicates with the outlet chamber and with the second flexible member;
   e. a first cap overlying said first flexible member and a second cap overlying said second flexible member, said caps and said flexible members defining control cavities that overly said openings; and
   f. a mechanical flow regulator within at least one of the cavities for pressing the flexible member toward the body;
   g. comprising:
   adjusting the mechanical flow regulator to set the flow rate through the openings covered by the diaphragm controlled by said flow regulator; and
   switching the valve between pre-set flow rates by supplying control fluid to various combinations of the individual control cavities.

* * * * *